United States Patent
Meyers et al.

(10) Patent No.: US 12,001,190 B2
(45) Date of Patent: Jun. 4, 2024

(54) DYNAMIC CREATION OF PLANT CONTROL GRAPHICAL USER INTERFACE AND PLANT CONTROL LOGIC

(71) Applicant: TRANE INTERNATIONAL INC., Davidson, NC (US)

(72) Inventors: Brian Meyers, Woodbury, MN (US); Kathylynn Hanggi Sedro, Lake Elmo, MN (US); Anthony W. Bruno, Blaine, MN (US); Brian A Kirkman, Shoreview, MN (US); Mayra R. Reyes Elizondo, Roseville, MN (US); Robert Jahn, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 29 days.

(21) Appl. No.: 17/138,191

(22) Filed: Dec. 30, 2020

(65) Prior Publication Data

US 2022/0206457 A1 Jun. 30, 2022

(51) Int. Cl.
| | |
|---|---|
| G05B 19/4063 | (2006.01) |
| G05B 19/4097 | (2006.01) |
| G05B 19/418 | (2006.01) |
| G06F 3/0484 | (2022.01) |
| G06Q 10/0639 | (2023.01) |

(52) U.S. Cl.
CPC ..... *G05B 19/4063* (2013.01); *G05B 19/4097* (2013.01); *G05B 19/418* (2013.01); *G06F 3/0484* (2013.01); *G06Q 10/06393* (2013.01); *G05B 2219/32085* (2013.01); *G05B 2219/32128* (2013.01)

(58) Field of Classification Search
None
See application file for complete search history.

(56) References Cited

U.S. PATENT DOCUMENTS

| | | | | |
|---|---|---|---|---|
| 3,555,251 | A | * | 1/1971 | Shavit ...................... F24F 11/46 |
| | | | | 236/DIG. 8 |
| 7,983,180 | B2 | | 7/2011 | Harrington et al. |
| 8,254,352 | B2 | | 8/2012 | Negron et al. |
| 9,542,208 | B2 | | 1/2017 | Gandhi et al. |
| 9,978,109 | B1 | | 5/2018 | Catalano |

(Continued)

OTHER PUBLICATIONS

Cline et al. (Non-patent Literature) (Year: 2009).*
Extended European Search Report issued in European Patent Application No. 21218118.4, dated May 24, 2022 (7 pages).

*Primary Examiner* — William L Bashore
*Assistant Examiner* — Gabriel Mercado
(74) *Attorney, Agent, or Firm* — HSML P.C.

(57) ABSTRACT

Method and systems for dynamically generating or editing a graphical dashboard via a graphical user interface (GUI) setup are provided. The method includes determining a type of a plant through the GUI setup, determining a configuration of the plant through the GUI setup, determining at least one component of the plant through the GUI setup, and configuring parameters of the at least one component and/or the plant through the GUI setup. The method also includes generating the dashboard including a plant control logic of the plant based on the type, the configuration, the at least one component, and the parameters of the at least one component and/or the plant. The method further includes controlling the plant based on the plant control logic.

20 Claims, 14 Drawing Sheets

(56) References Cited

U.S. PATENT DOCUMENTS

| | | |
|---|---|---|
| 10,006,685 B2 | 6/2018 | Sullivan et al. |
| 10,244,413 B2 | 3/2019 | Barmettler et al. |
| 10,269,235 B2 | 4/2019 | Dayalan et al. |
| 10,394,970 B2 | 8/2019 | Linehan et al. |
| 10,535,022 B1* | 1/2020 | Hood ................. G06Q 10/0637 |
| 2007/0168065 A1* | 7/2007 | Nixon .................... H04L 67/36 |
| | | 715/965 |
| 2009/0210081 A1* | 8/2009 | Sustaeta ............... H04L 67/125 |
| | | 715/702 |
| 2014/0040792 A1 | 2/2014 | Kodosky et al. |
| 2014/0100668 A1 | 4/2014 | Jundt et al. |
| 2014/0108985 A1* | 4/2014 | Scott ...................... G05B 15/02 |
| | | 715/771 |
| 2015/0193418 A1 | 7/2015 | Koska et al. |
| 2015/0212714 A1* | 7/2015 | Hua ..................... G05B 19/409 |
| | | 715/739 |
| 2015/0346942 A1* | 12/2015 | Oren .................. G06F 3/04847 |
| | | 715/769 |
| 2016/0366036 A1 | 12/2016 | Gupta et al. |
| 2018/0089988 A1* | 3/2018 | Schwarzkopf ......... G06Q 50/08 |
| 2019/0011901 A1 | 1/2019 | Wu et al. |
| 2019/0041882 A1* | 2/2019 | Noboa ..................... F24F 11/30 |
| 2019/0278442 A1* | 9/2019 | Liang ..................... G08B 21/18 |
| 2019/0323823 A1 | 10/2019 | Atchison et al. |
| 2021/0081099 A1* | 3/2021 | Uy ...................... G06F 3/04817 |
| 2021/0158264 A1* | 5/2021 | Ehrgott ................ G06Q 10/103 |

* cited by examiner

Fig. 6B

| | |
|---|---|
| Number of Chillers | ☐ |
| Pump Configuration | Dedicated pumps ▼ |
| Number of Pumps in Manifold | ☐ |

Fig. 6C

| | |
|---|---|
| Number of Chillers | ☐ |

Fig. 6D

| | |
|---|---|
| Number of Series Pairs | 2 |
| Pump Configuration | Dedicated pumps ▼ |
| Number of Pumps in Manifold | ☐ |

Fig. 6E

| | | |
|---|---|---|
| Number of Pods | ☐ | Apply |
| Number of Chillers in Pod 1 | 2 | |
| Number of Chillers in Pod 2 | 2 | |

Fig. 9B

| Equipment | Power |
|---|---|
| Primary Chilled Water Pump | value |
| Secondary Chilled Water Pump | value |
| Chilled Condenser Water Pump | value |
| Cooling Tower Fan | value |

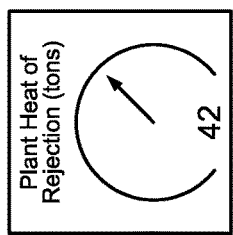
Chilled Water Flow (gpm) 42

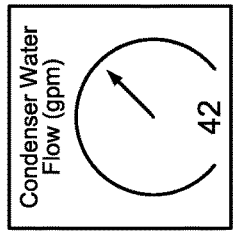
Condenser Water Flow (gpm) 42

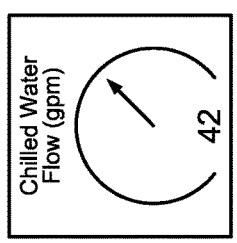
Plant Heat of Rejection (tons) 42

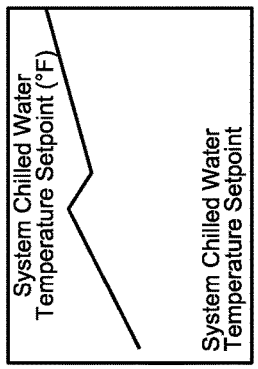
Chilled Water (°F) — Supply Temperature, Return Temperature

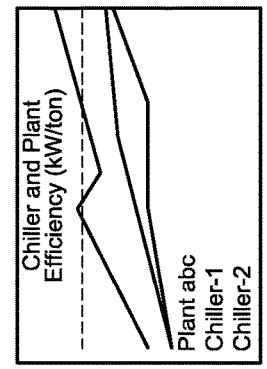
Condenser Water (°F) — Entering Water Temperature, Leaving Water Temperature

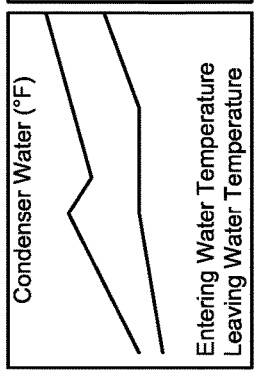
System Chilled Water Temperature Setpoint (°F) — System Chilled Water Temperature Setpoint

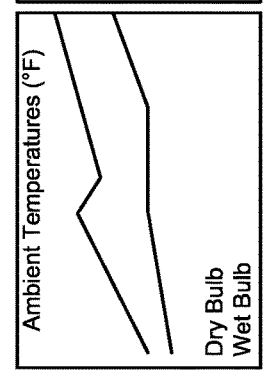
Ambient Temperatures (°F) — Dry Bulb, Wet Bulb

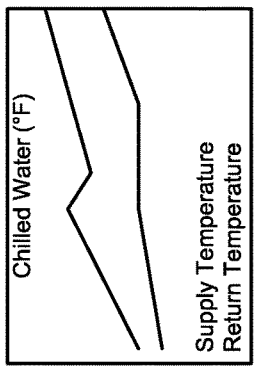
Chilled Water Plant — Thermal Output (tons), Efficiency (kW/ton), Power Consumption (W)

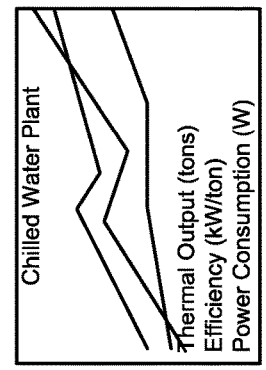
Chiller and Plant Efficiency (kW/ton) — Plant abc, Chiller-1, Chiller-2

| Maximum Daily Chilled-Water Plant Thermal Cooling | | |
|---|---|---|
| Interval | Max Tons | Max Ton-Hours |
| Today | value | value |
| Yesterday | value | value |
| This Week | value | value |
| Last Week | value | value |
| This Month | value | value |
| Last Month | value | value |
| Year to Date | value | value |
| Last 12 Months | value | value |

Fig. 10A

| KPI | Ask about this in wizard | In final graphic | In dashboard |
|---|---|---|---|
| Primary chilled water pump power | YES | | table |
| Secondary chilled water pump power, if it exists | YES | | table |
| Chilled condenser water pump power | YES | | table |
| Cooled tower fan power, if water cooled plant | YES | | table |
| Chilled water flow | YES | | gauge |
| Condenser water flow | YES | | gauge |
| Chilled water supply temp | YES | number | line chart w/return temp |
| Chilled water return temp | YES | number | in same line chart as supply temp |
| Condenser entering water temp | YES | number | line chart with condenser leaving |
| Condenser leaving water temp | YES | number | line chart w/condenser entering |
| Ambient dry bulb temp | Potentially - Synchrony already has OAT built-in | number | line chart w/wet bulb (possibly same chart as condenser entering/leaving) and bar gauge (instantaneous) or just display the number |
| Ambient wet bulb temp | Potentially - Synchrony already has OARH built-in, and WB could be calculated from OAT and OARH | number | line chart w/dry bulb (possibly same chart as condenser entering/leaving) and bar gauge (instantaneous) or just display the number |
| Chilled water thermal output (tons) for plant | YES | | line chart with plant efficiency. Show instant. Value also |
| Chilled water plant efficiency for plant | Calculated | | line chart w/chilled water thermal output for plant. Show instant. Value also |
| Chilled water plant power consumption | Calculated | | On same line chart as prev. 2. Show instant. Value also |

Fig. 10B

| KPI | Ask about this in wizard | In final graphic | In dashboard |
|---|---|---|---|
| *****Plant heat of rejection (tons) --likely 1 value | YES | visually | Single value |
| Tower cells (integer number of cells) | YES | number | |
| Fan speed for each tower fan | YES | value | . |
| Fan status for each tower fan | YES | | |
| *****Annual kw/ton for plant (past 12 months -- rolling window). This will likely be 12 values | Calculated | | Table (values for several years) |
| Condenser pump speed for each pump | YES | number | . |
| Condenser pump status for each pump | YES | value | . |
| Chilled water pump speed for each pump | YES | number | . |
| Chilled water pump status for each pump | YES | value | . |
| Chiller run status for each chiller | Automatic | value | . |
| Chiller % load | Automatic | number | . |
| System chilled water temperature setpoint | YES | number | Line chart |

DYNAMIC CREATION OF PLANT CONTROL GRAPHICAL USER INTERFACE AND PLANT CONTROL LOGIC

FIELD

This disclosure relates generally to building automation systems. More specifically, the disclosure relates to systems and methods for dynamically generating a plant control graphical user interface (GUI) and control logic through a graphical setup wizard for building automation systems.

BACKGROUND

Building automation systems are used to coordinate, manage, and automate control of diverse environmental, physical, and electrical building subsystems, particularly heating, ventilation, air conditioning, and refrigeration (HVACR) systems and climate control which may also include security, lighting, power, and the like. An HVACR system may include e.g., a rooftop unit, etc. to provide conditioned air to an air distribution system that includes ductwork. In HVACR systems, conditioned air is delivered to a building or occupied space. Air handlers or the air handler sections of an air conditioning unit for meeting the HVACR needs of a building often include a heat transfer circuit system housed within a sheet metal enclosure. The heat transfer circuit may include one or more compressors, a condenser, an evaporator, fans, filters, dampers, and various other equipment. The compressor(s), the condenser, the expansion device, and the evaporator are fluidly connected.

SUMMARY

This disclosure relates generally to building automation systems. More specifically, the disclosure relates to systems and methods for dynamically generating a plant control GUI and control logic through a graphical setup wizard for building automation systems.

Embodiments disclosed herein provide visual aids guiding user(s) to configure a plant by selecting or configuring the plant type, the plant configuration, plant components, plant sequences, the configuration of parameters of the plant, etc. Upon completion of the graphical setup wizard, a graphic dashboard and a plant control logic can be dynamically created for the user(s). The graphic dashboard for the plant includes the components of the plant such as pump(s), valve(s), piping, chiller(s), boiler(s), etc. The control logic includes operating control or operating logic associated with the respective components. Also, upon completion of a graphical setup wizard, the graphical dashboard including a visualization of Key Performance Indicators (KPIs) and/or an interactive plant diagram with real-time values (e.g., measured/sensed parameter values such as temperature, pressure, humidity, etc.) for interacting with the plant can be dynamically created for the user(s). Embodiments disclosed herein can simplify the process for a user to e.g., define the plant sequences, program the plant sequences, create customized graphics for the plant, and/or map the control points to the customized graphics for the plant, etc. without requiring specific knowledge of a plant library.

A method for dynamically generating or editing a plant dashboard via a GUI setup is disclosed. The method includes determining a type of a plant through the GUI setup, determining a configuration of the plant through the GUI setup, determining at least one component of the plant through the GUI setup, and configuring parameters of the at least one component and/or the plant through the GUI setup. The method also includes generating the plant dashboard including a plant control logic based on the type, the configuration, the at least one component, and the parameters of the at least one component of the plant. The method further includes controlling the plant based on the plant control logic.

A building automation system (BAS) is disclosed. The system includes a plant associated with at least one of a space, a system, or a subsystem for at least a portion of a building or a campus. The system further includes a controller, and a GUI setup. The GUI setup is configured to generate or edit a plant dashboard including a plant control logic based on a type of the plant, a configuration of the plant, at least one component of the plant, and parameters of the at least one component of the plant. The controller is configured to control the plant based on the plant control logic.

BRIEF DESCRIPTION OF THE DRAWINGS

References are made to the accompanying drawings that form a part of this disclosure and which illustrate the embodiments in which systems and methods described in this specification can be practiced.

FIGS. 9A and 9B illustrate a graphical dashboard generated via the setup wizard, according to an embodiment.

FIGS. 10A and 10B illustrate a list of KPIs that can be shown as part of the KPIs of FIGS. 9A and 9B, according to an embodiment.

Like reference numbers represent like parts throughout.

DETAILED DESCRIPTION

Figure 1:
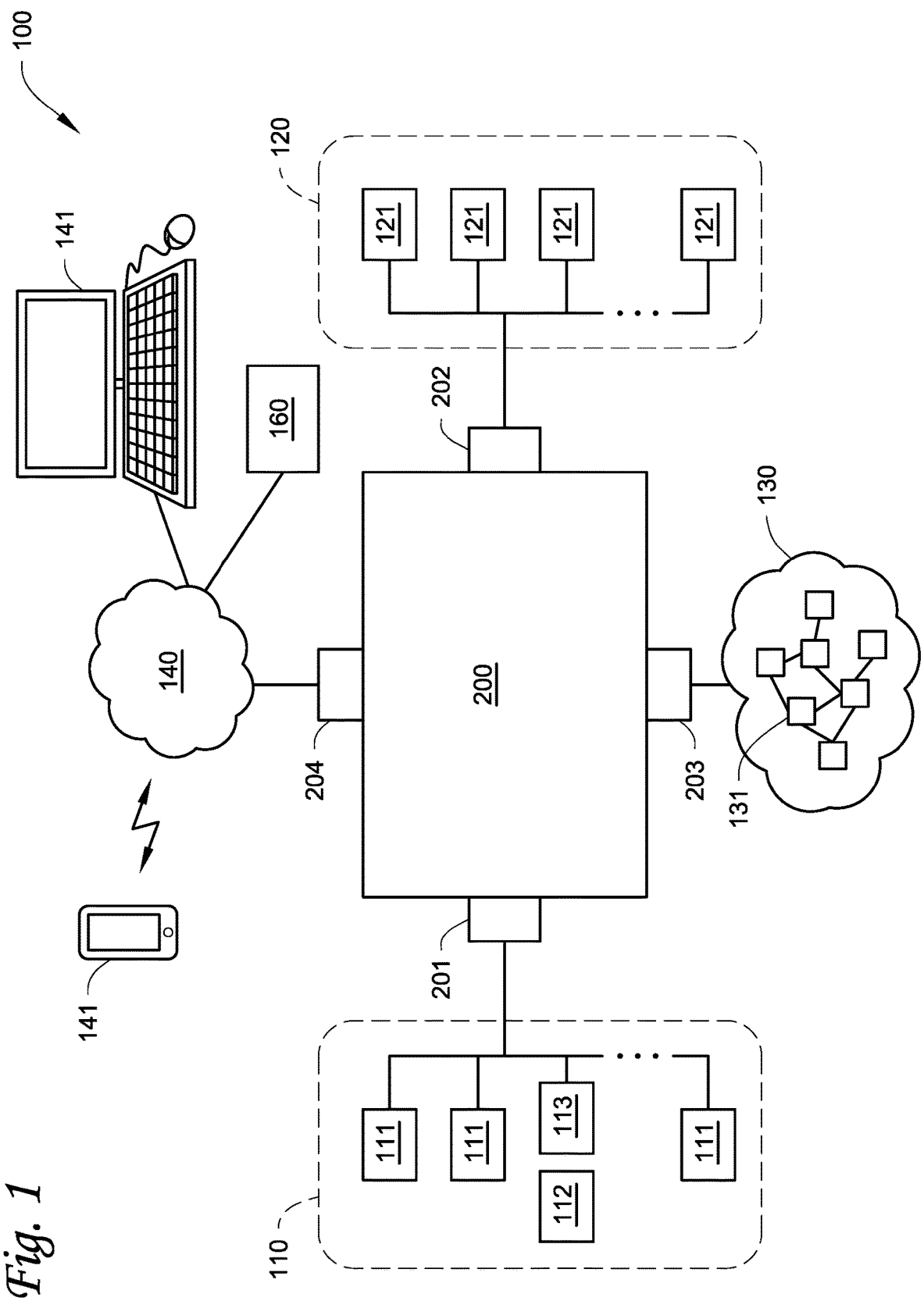
FIG. 1 illustrates a schematic diagram of a building automation system, according to an embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The following definitions are applicable throughout this disclosure. As defined herein, the term "building automation system" or "BAS" may refer to a system used to coordinate, manage, and automate control of diverse environmental, physical, and electrical building subsystems, particularly HVACR systems and climate control and which may also include security, lighting, power, and the like. It will be appreciated that different embodiments of the BAS are described in U.S. Pat. No. 10,269,235, which is hereby incorporated by reference in its entirely.

As defined herein, the term "plant" may refer to a set of equipment or components (e.g., one or more of compressors, condensers, chillers, pumps, pipe works, switchboards, wiring, valves, fans, thermostats, cooling towers, air handling units, duct work, etc.) used for the production and reticulation of chilled, heated, or conditioned fluid (e.g., liquid such as water, gas such as air, etc.). A plant may be a water plant (chilled water and/or heated water), a boiler plant, a simultaneous heating and/or cooling plant, an air plant, etc. In an embodiment, a plant may have e.g., one or more air cooled condensers or one or more cooling towers or the like connected via one or more fluid (liquid, gas, etc.) circuits to one or more chillers. An HVACR system may include a chiller (e.g., a water chiller, an air cooled chiller, etc.). In an embodiment, chillers may include motors and various compressor types thereof, electronics cooling, bearings, air handlers, purges, evaporators, and condensers, etc. As defined herein, the term "component" or "components" of a plant may refer to any equipment in the plant. A plant may include one or more "components" such as pumps (e.g., condenser pumps) that direct the flow of fluid in the fluid circuit, one or more flow control devices (e.g., valves, switches, etc.) that control the fluid flow in the fluid circuit, piping (e.g., pipes) in the fluid circuit, one or more chillers, one or more boilers, one of more fans, etc. It will be appreciated that different embodiments of the plant are described in U.S. Pat. No. 10,006,685, which is hereby incorporated by reference in its entirely.

As defined herein, the term "points" or "points of control" or "control points" may refer to sensor inputs, control outputs, or control values (of a controller), with different characteristics according to manufacturer. In an embodiment, the inputs and outputs of a controller may be referred as control points of the controller. A "point" may refer to a control operation, such as a sensing action (e.g., sensor input), a controlling action (e.g., control output), etc. For example, a point may include a temperature sensor input, an output of a proportional controller operating a control valve, etc.

As defined herein, the term "dynamically generating" or "dynamic creation" or the like may refer to creating or generating, e.g., outputs such as outputted user interfaces (e.g., GUIs, etc.), based on an action (e.g., of a user) such as selecting, clicking, entering data, etc. on current user interface(s). For example, when a user changes a configuration of a plant (e.g., the number of chillers on a leg/branch of a fluid circuit) on a GUI, the GUI may dynamically generate a graphical diagram showing the newly configured chillers on the leg/branch based on the changed configuration.

Embodiments disclosed herein provide a GUI setup wizard that can prompt a user to select a plant type from a set of graphical representation of plant layouts (for assisting the user in selecting the appropriate plant type to match the mechanical layout of a building) upon initiation of the setup wizard. After the plant type selection, the setup wizard can prompt the user with additional graphical options for configuring the plant's equipment/components. As the user progresses through the configuration of the plant, the setup wizard can present graphical illustrations of previous selections, and request from the user increasingly specific questions based upon user's selections in previous steps/GUIs.

The setup wizard can also guide user's subsequent actions through graphics and/or other input mechanisms (e.g., command lines, dropdown lists, radio buttons, voice inputs, etc.) to assist the user in making appropriate selections. Once the setup wizard is completed, the plant control application/logic may have obtained all the requisite knowledge in order to configure and run a pre-engineered plant control application, and a GUI with Key Performance Indicators (KPIs) can be created by the application, with all required calculations and control point mapping completed.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

FIG. 1 illustrates a schematic diagram of a building automation system 100, according to an embodiment. The BAS 100 includes a BAS controller 200 that is communicatively coupled with a number of building automation networks (BAN) 110, 120, 130. The BANs 110, 120, 130 may facilitate communication between BAS controller 200 and any number of BAS end devices 111, 112, 121, and 131. The end devices 111, 112, 121, and 131 may include a range of HVAC equipment such as plants (e.g., 300 of FIG. 3), chillers, air handlers, furnaces, or boilers with multiple data sensors producing a continuous stream of data, variable air volume (VAV) boxes and dampers, temperature or humidity sensors monitoring a space, etc. In an embodiment, the end devices include a panel, a sensor, a controller, a microprocessor-controlled device, a converter, a thermostat, a furnace, a heating system, a chiller, a cooling system, an air conditioner, an air filter, an air purifier, a fire and life safety system, a security system, an alarm system, an occupancy sensor, an electrical system monitor and controller, a lighting system monitor and controller, a ventilation system monitor and controller, a smoke sensor, a light sensor, a motion sensor, a humidity sensor, a pump, an air handler, fluid and air moving and handling equipment, a terminal device, life science and pharmacological control equipment and monitoring systems, a positive pressure clean room, a negative pressure clean room, industrial automation and control equipment and systems, a programmable logic controller, etc.

The BAS controller 200 includes a communications interface 201 which couples the BAS controller 200 to a BAN 110. The BAN 110 includes a number of end devices 111 and end devices 112 coupled to the BAN 110 using a media converter 113. The end devices 111, 112, 121 can be e.g., chillers, air handlers, furnaces, boilers, VAV boxes, dampers, temperature or humidity sensors, and the like. The BAS controller 200 also includes a communications interface 202 which couples the BAS controller 200 to a BAN 120. The BAS controller 200 further includes a communications interface 203 which couples the BAS controller 200 to a BAN 130. The BAN 130 includes end devices 131 such as temperature sensors, humidity sensors, CO2 sensors, etc. The BAS controller 200 also includes a data network interface 204 for communicating data to one or more user devices 141 over a data network 140, such as a private LAN and/or the public Internet. User devices 141 may include a mobile telephone, smart phone, tablet device, smart watch, pager, notebook computer, and/or a desktop computer, and the like. A remote server 160 is communicatively coupled to the BAS controller 200 via the data network 140 and stores information for a plurality of end devices, including information relating to specific products, product versions, firmware versions, and/or software versions.

Figure 2:
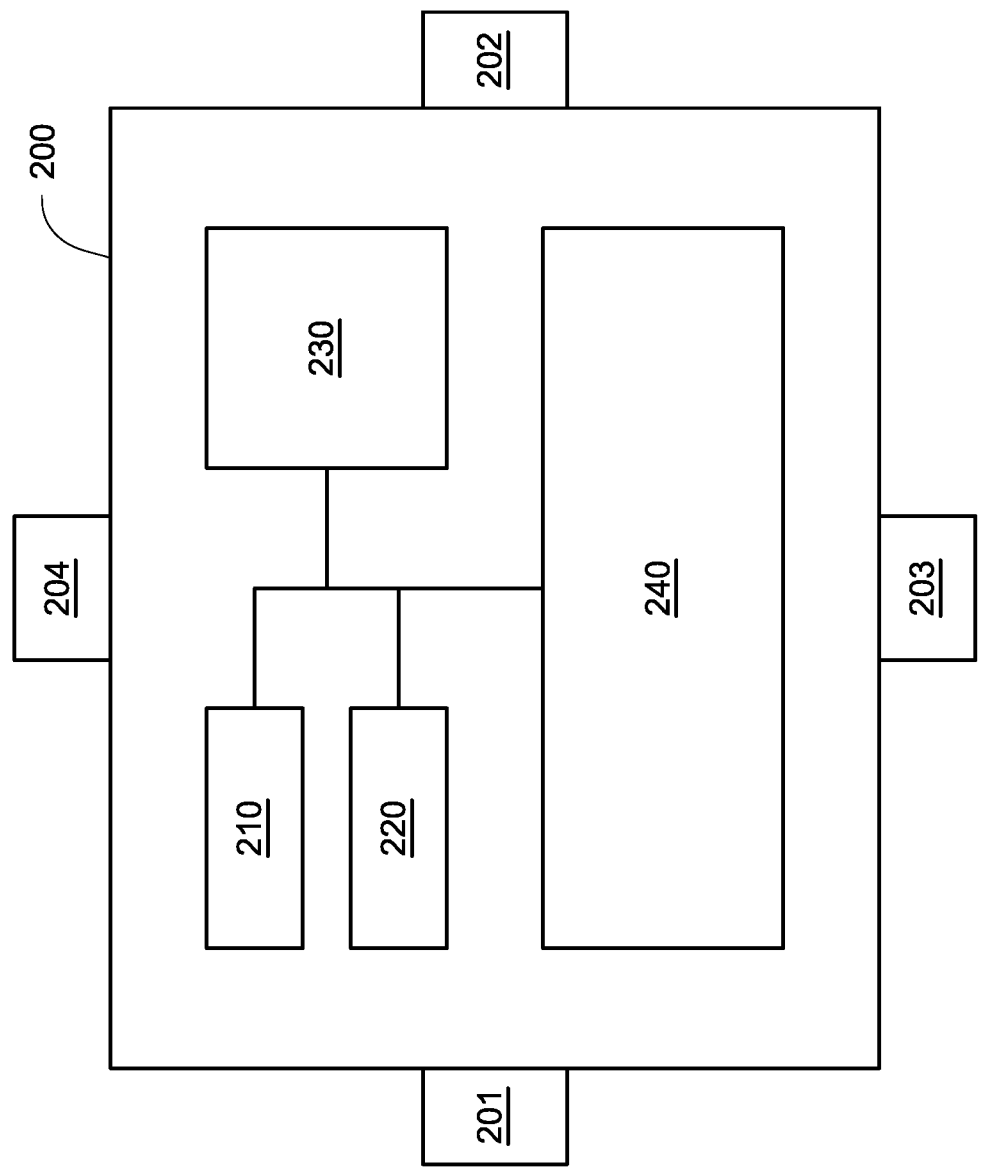
FIG. 2 illustrates a schematic diagram of a building automation system controller, according to an embodiment.

FIG. 2 illustrates a schematic diagram of a building automation system controller 200, according to an embodiment. The BAS controller 200 includes a processor 210 in operative communication with a memory 220, a user interface 230, and data storage 240. The memory 220 includes RAM memory which can be used, for example, for storage of transient data, computed and intermediate results, I/O buffering, GUI buffering, program execution, and any other suitable purposes. Data storage 240 includes non-volatile storage such as a flash drive, EEPROM, ROM, magnetic hard disk, solid state disk (SSD), hybrid drives (combination hard disk/SSD) which can be used for storage of data which persists through power cycling.

Figure 3:
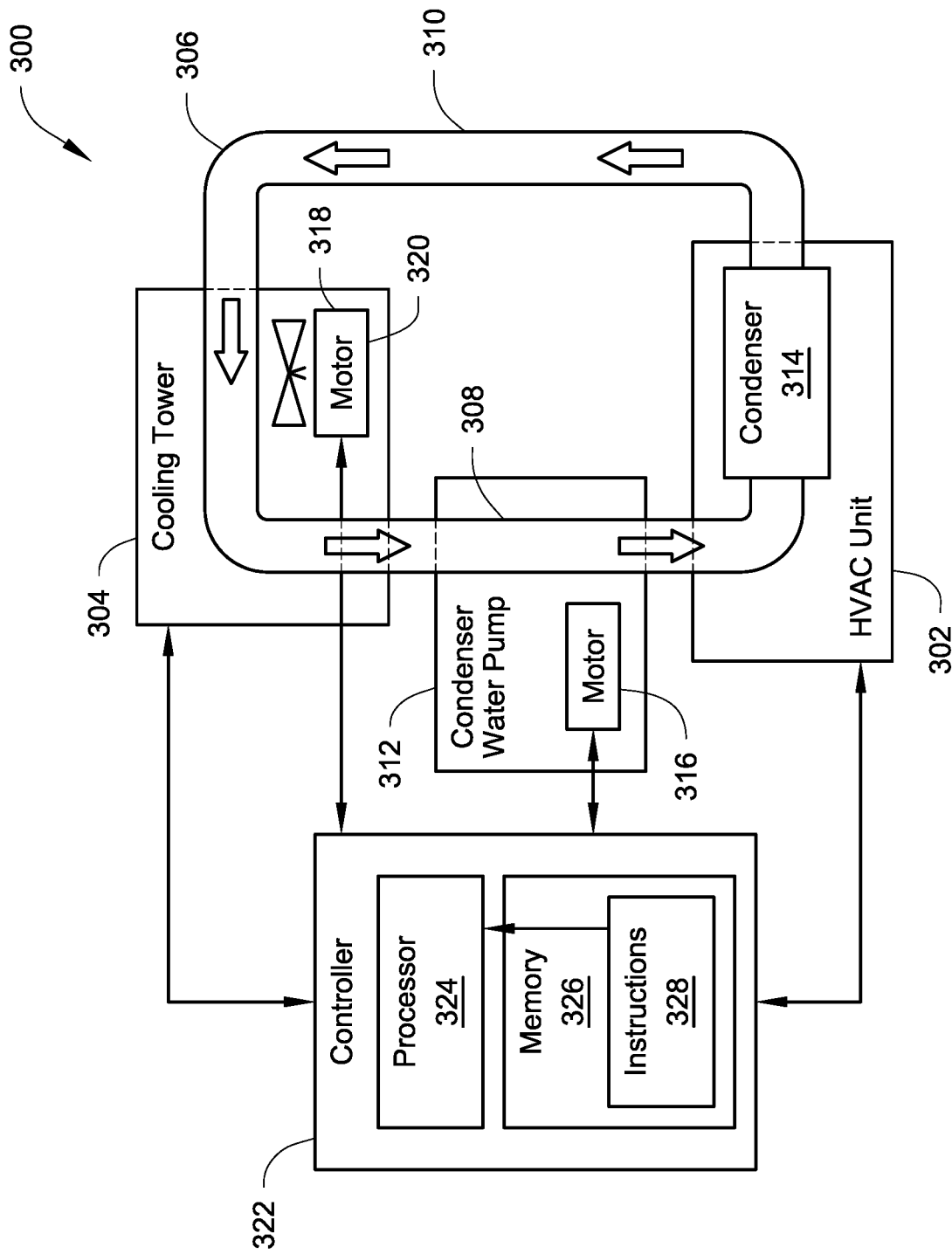
FIG. 3 illustrates is a schematic diagram of a plant, according to an embodiment.

User interface 230 includes a number of elements which facilitate user input and the display of output to the user, and may include one or more of buttons, switches, LED indicators, a character display such as a liquid crystal display (LCD) or a vacuum fluorescent display (VFD), a graphic display such as a thin film transistor (TFT) display, a touchscreen display, and the like. FIG. 3 illustrates is a schematic diagram of a plant 300, according to an embodiment. The plant 300 includes an HVACR unit (e.g., which can be or include a chiller) 302 and a cooling tower 304 connected via a fluid circuit 306. It will be appreciated that the cooling tower 304 can be optional. In another embodiment, a plant (e.g., an air cooled chiller plant) may not have a cooling tower but have a condenser instead. The cooling tower 304 includes a fan 318 connected to a motor 320. In an embodiment, the HVACR unit 302 can be a water-cooled chiller. The fluid circuit 306 has a condenser fluid supply side (e.g., cold water side) 308 and a condenser fluid return side (e.g., hot water side) 310. The fluid circuit 306 includes a pump 312 for pumping fluid (e.g., water) through the fluid circuit 306. For example, the pump 312 can be a condenser pump which operates to direct cooled fluid from the cooling tower 304 to a condenser side 314 of the HVACR unit 302 via the condenser fluid supply side 308. The pump 312 (e.g., the condenser pump) has a motor 316. It will be appreciated that the plant 300 can have multiple chillers, multiple cooling towers (or multiple fans and/or multiple cells), multiple fluid circuits, multiple boilers, and/or multiple pumps, etc.

The plant 300 includes a controller 322. An example of the controller 322 is a computer including a processor 324 and a non-transitory memory 326 in communication with the processor 324. In some embodiments, the controller 322 is (or includes, or can be connected to) a specialized computer specifically configured to perform the methods disclosed herein. The non-transitory memory 326 stores computer-readable instructions 328 which are executable by the processor 324. The computer-readable instructions 328 are directed to one or more methods for controlling one or more of the components of the plant 300.

In an embodiment, the controller 322 operating according to the executed computer-readable instructions 328 is in communication with other components, such as, one or more sensors (or detectors) for detecting, for example, temperatures and/or pressures at various points in the plant 300. In an embodiment, the controller 322 (or the controller 200 of FIG. 2 or any other suitable controller) can include computer-readable instructions 328 for carrying out a method for dynamically generating or editing a plant dashboard with a plant control logic via a GUI setup wizard.

FIGS. 4-8 illustrate graphical user interfaces of a setup wizard, according to an embodiment. It will be appreciated that the graphical user interfaces (e.g., frames, buttons, checkboxes, text fields, dropdown lists, etc.) disclosed herein are exemplary and for descriptive purposes only and are not intended to be limiting. Any component (e.g., frame, button, checkbox, text field, dropdown list, and the like) of the GUI can be replaced with other suitable components of the GUI without departing from the spirit or scope of the subject matter presented herein. It will also be appreciated that controller(s) disclosed herein or any other suitable controller(s) can be configured to run the setup wizard, and the GUI of the setup wizard can be displayed in an output device (e.g., a display device) by the controller. In an embodiment, the setup wizard can be a configuration tool (e.g., a software application) to e.g., edit the generated plant dashboard.

Figure 4:
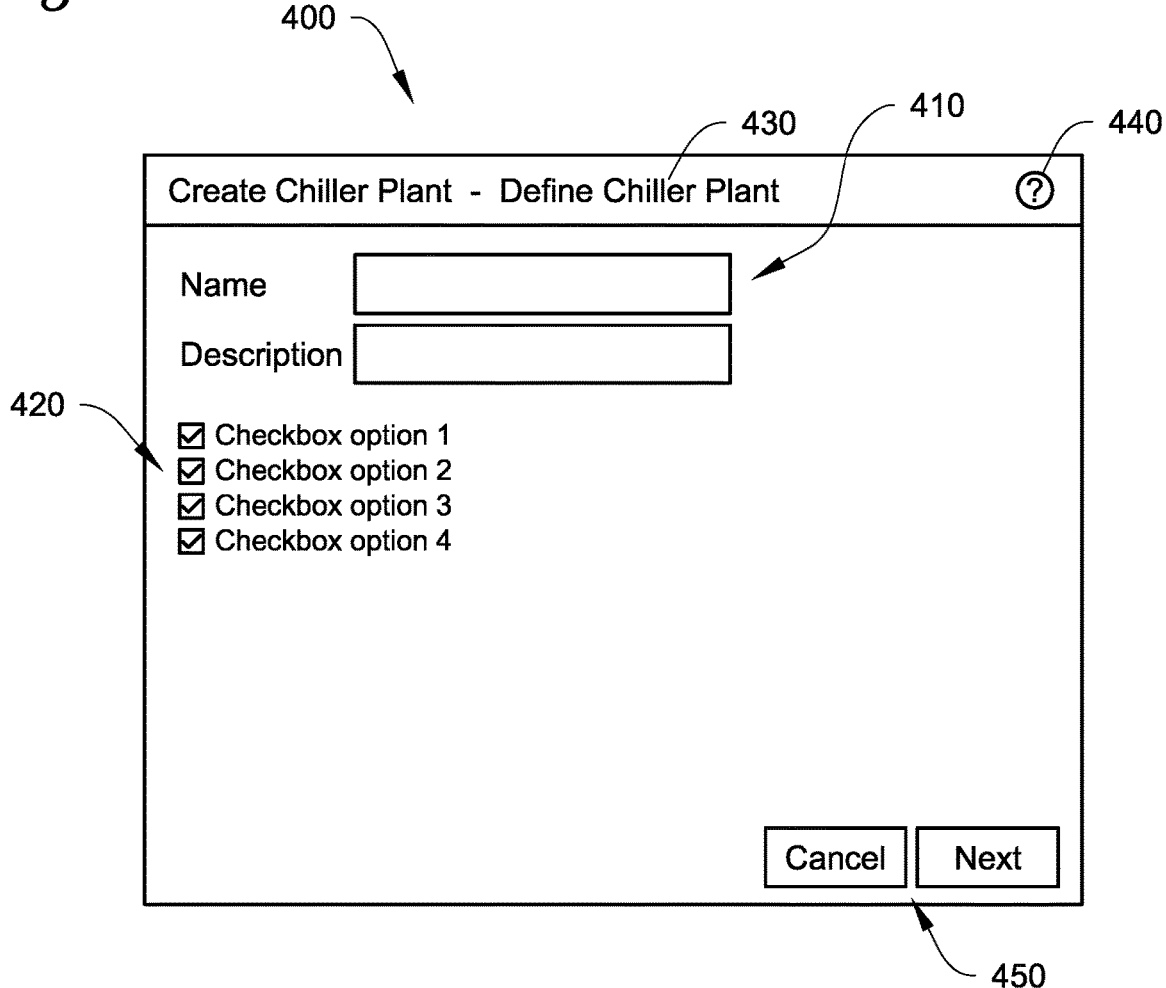
FIGS. 4-8 illustrate graphical user interfaces of a setup wizard, according to an embodiment.

FIG. 4 illustrates a GUI 400 of a setup wizard, according to an embodiment. The GUI 400 may be a first GUI when the setup wizard is started. In an embodiment, the GUI 400 may be a frame including a title 430, an information button 440, fields 410, checkboxes 420, buttons 450, etc.

In FIG. 4, the title 430 may include text "Create Chiller Plant—Define Chiller plant". It will be appreciated that the text disclosed herein can be any suitable text. It will also be appreciated that embodiments described and recited herein are not limited to chiller plants. That is, the plant described and recited herein is provided for descriptive purposes only and is not intended to be limiting. The plant may be a water plant (chilled water and/or heated water), a boiler plant, a simultaneous heating and/or cooling plant, an air plant, etc.

The information button 440 is configured to show information (e.g., in a popup dialog independent to the GUI 400) that is helpful to understand the components of the GUI 400, when the information button 440 is clicked on.

The fields 410 include a label "Name", a text field for entering the name of the plant, a label "Description", and a text field for entering detailed description of the plant.

The checkboxes 420 include a plurality of checkboxes along with their respective descriptions. Selecting none, one, or more of the checkboxes may generate a plant control logic with predetermined feature(s) being disabled or enabled. For example, in an embodiment, one checkbox may include "Use Chiller plant to start up and shut down system chilled water pumps". Selecting such checkbox may generate a chiller plant (e.g., a graphical dashboard) with a plant control logic that is able to start up and shut down system chilled water pumps. Unselecting such checkbox may generate a chiller plant (e.g., a graphical dashboard) with a plant control logic that is not able to start up and shut down system chilled water pumps.

The buttons 450 include a "Cancel" button (configured to cancel the running of the setup wizard when the button is clicked on), and a "Next" button (configured to navigate the current GUI (e.g., 400) of the setup wizard to the next GUI (e.g., 500 of FIG. 5) when the button is clicked on). It will be appreciated that the text on the buttons 450 may be any suitable text. In an embodiment, the "Next" button is disabled (not enabled) until a required input (e.g., the name of the chiller plant) is entered.

Figure 5:
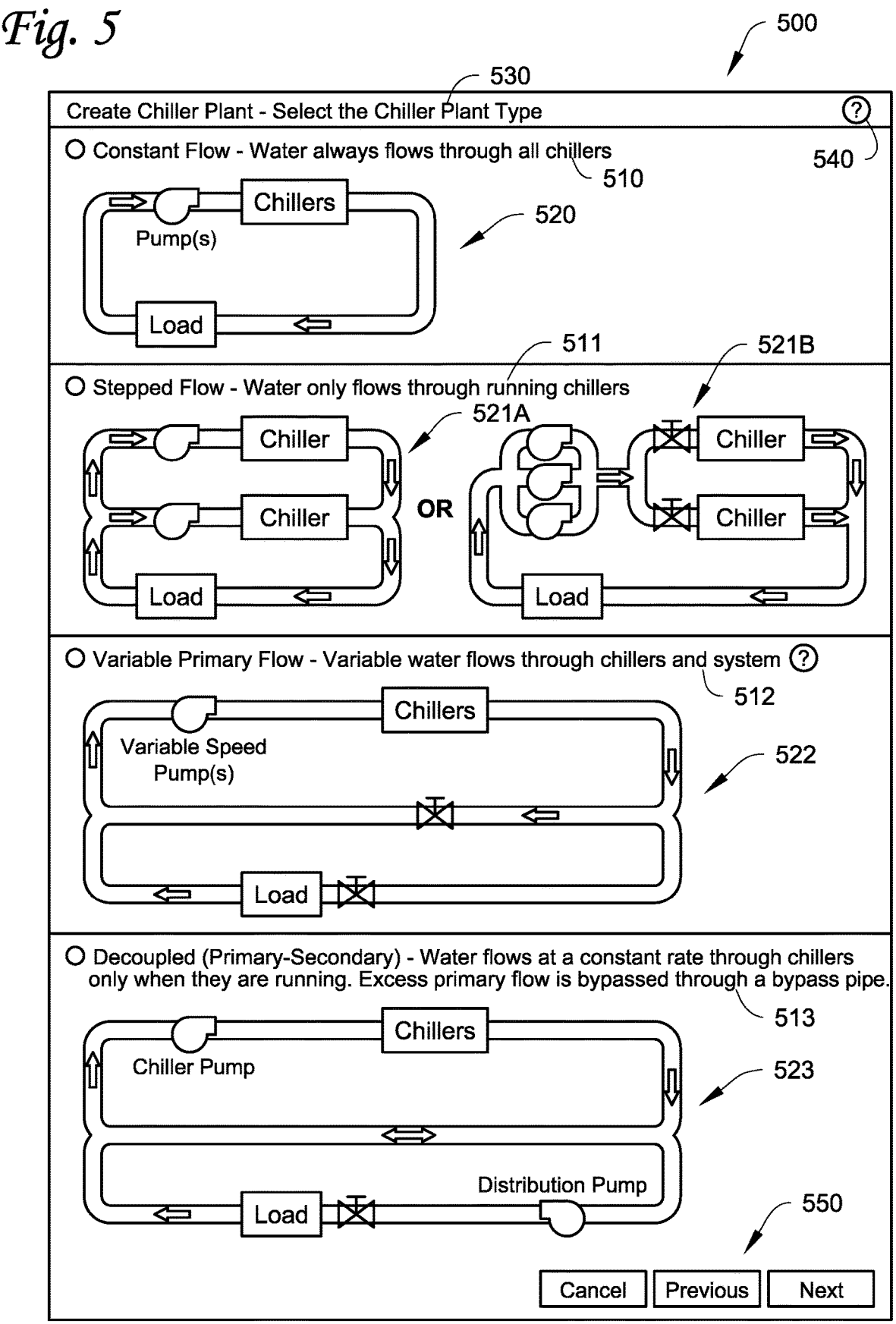

FIG. 5 illustrates a GUI 500 of a setup wizard, according to an embodiment. In an embodiment, the GUI 500 can be a frame including a title 530, radio buttons (510, 511, 512, 513), graphical plant types (520, 521A, 521B, 522, 523), buttons 550, and information button 540 in the frame.

In FIG. 5, the title 510 includes text "Create Chiller Plant—Select the Chiller Plant Type". It will be appreciated that the text disclosed herein can be any suitable text. The radio buttons (510, 511, 512, 513) includes a radio button 510 (with text "Constant Flow—Water always flows through all chillers"), a radio button 511 (with text "Stepped Flow—Water only flows through running chillers"), a radio button 512 (with text "Variable Primary Flow—Variable water flows through chillers and system"), and a radio button 513 (with text "Decoupled (Primary-Secondary)—Water flows at a constant rate through chillers only when they are running. Excess primary flow is bypassed through a bypass pipe").

A graphical plant type 520 (e.g., a constant flow plant type, where fluid always flows through all chillers in the plant) is disposed under its corresponding radio button 510. The plant type 520 includes chillers, pump(s), a load, and a fluid circuit showing a direction of a fluid flow (see arrows).

Graphical plant types 521A, 521B (e.g., a stepped flow plant type, where fluid only flows through working chillers (e.g., the chiller(s) that is/are running and/or turned on and/or having an open valve) in the plant) is disposed under their corresponding radio button 511. The plant type 521A includes chiller(s) each having a dedicated pump, a load, and a fluid circuit showing a direction of a fluid flow (see arrows). The plant type 521B includes chillers, pump(s), a load, valve(s) (each valve is disposed upstream of a chiller with respect to the fluid flow), and a fluid circuit showing a direction of a fluid flow (see arrows). The valve can be any suitable flow control device (valve, switch, and the like) that is used to control the fluid flow to each chiller that is running.

A graphical plant type 522 (e.g., a variable primary flow plant type, where variable fluid flows through chillers and system) is disposed under its corresponding radio button 512. The plant type 522 includes chillers, variable speed pump(s), a load with a valve disposed upstream of the load, a bypass valve disposed in parallel to the load, and a fluid circuit showing a direction of a fluid flow (see arrows). It will be appreciated that the bypass valve may be configured to modulate to maintain minimum chiller flows.

A graphical plant type 523 (e.g., a decoupled plant type, where fluid flows at a constant rate through chillers only when they are running, and excess primary flow is bypassed through a bypass pipe) is disposed under its corresponding radio button 513. The plant type 523 includes chillers, chiller pump, a load with a valve disposed upstream of the load and a distribution pump disposed upstream of the valve, a bypass pipe disposed in parallel to the load, and a fluid circuit showing a direction of a fluid flow (see arrows).

It will be appreciated that there can be other plant types (not shown). It will be appreciated that the setup wizard can obtain a plurality of plant types in a library (e.g., a layout library or a plant type library) that is pre-stored in the memory (e.g., of the controller), and display each plant type and its corresponding radio button in the GUI 500.

The information button 540, when it is clicked on, is configured to show information that is helpful to understand the components of the GUI 500. The buttons 550 include a "Cancel" button (configured to cancel the running of the setup wizard when is clicked on), a "Previous" button (configured to navigate the current GUI 500 of the setup wizard to a previous page/frame/GUI (e.g., 400 of FIG. 4) when is clicked on), and a "Next" button (configured to navigate the current GUI 500 of the setup wizard to the next GUI (e.g., 600 of FIG. 6) when is clicked on).

In operation, a user (e.g., a technician, an administrator of the building/BAS, etc.) can select any one of the radio buttons (510, 511, 512, 513, etc.) based on e.g., a mechanical plant layout of a building or a BAS, so that a plant type (e.g., 520, 521A/521B, 522, 523, or other type) is determined or selected. When the "Next" button is clicked, the GUI 500 is changed to GUI 600.

It will be appreciated that when no radio button (510, 511, 512, 513, etc.) is selected, the "Next" button may be disabled. When any one of the radio buttons (510, 511, 512, 513, etc.) is selected, the "Next" button may be enabled, and components (such as dropdown lists) may be shown next to the selected graphical plant types (520, 521A, 521B, 522, 523) in the same GUI 500 to e.g., allow user(s) to add or subtract methods (such as efficiency, temperature, and/or capacity, etc.) for the chiller plant (and its control logic) to be generated.

Figure 6A:
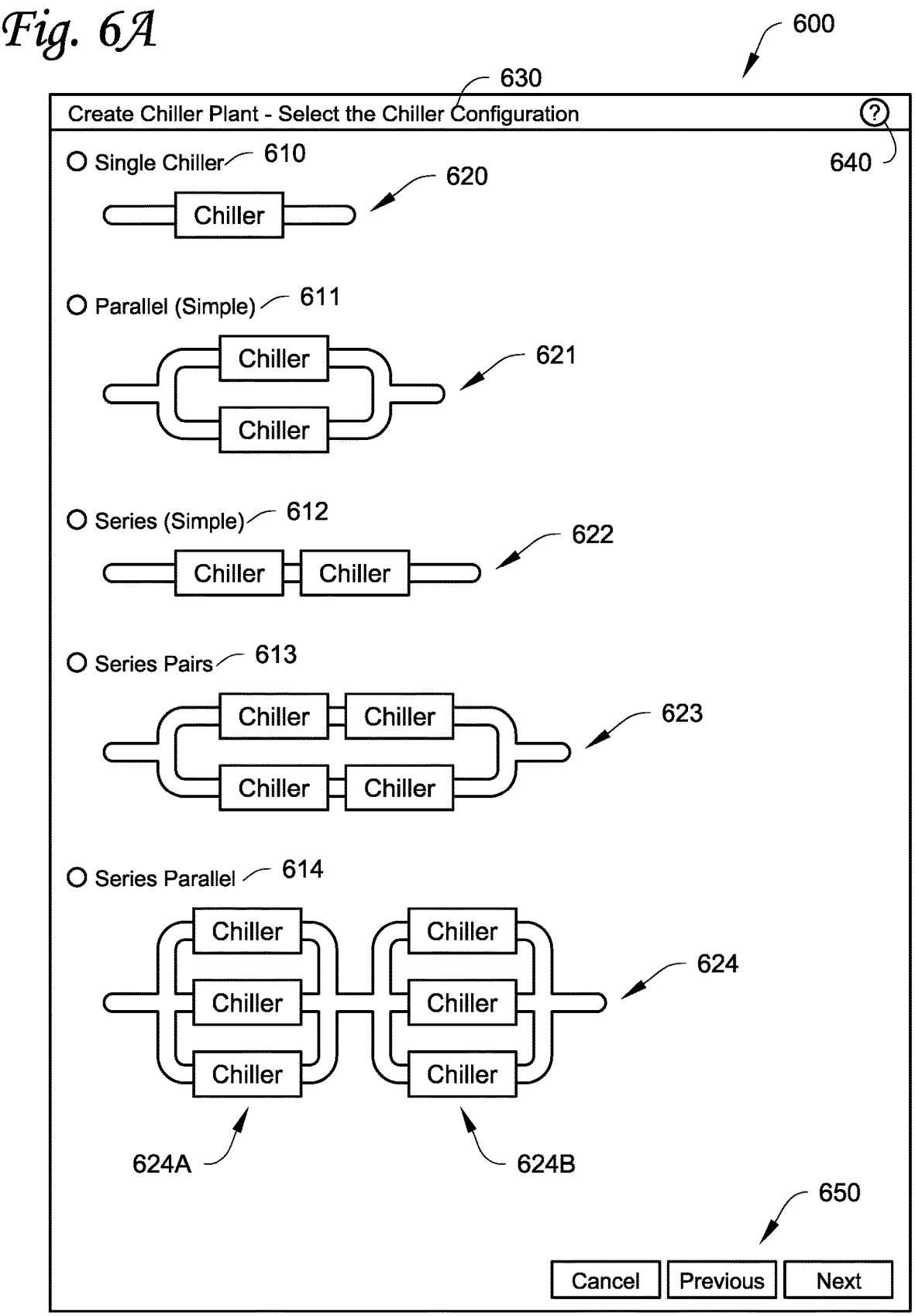

FIG. 6A illustrates a GUI 600 of the setup wizard, according to an embodiment. In an embodiment, the GUI 600 can be a frame including a title 630, radio buttons (610, 611, 612, 613, 614, etc.), graphical plant configurations (620, 621, 622, 623, 624), buttons 650, and/or information button 640 in the frame.

In FIG. 6A, the title 630 includes text "Create Chiller Plant—Select the Chiller Plant Configuration". It will be appreciated that the text disclosed herein can be any suitable text. The radio buttons (610, 611, 612, 613, 614, etc.) includes a radio button 610 (with text "Single Chiller"), a radio button 611 (with text "Parallel (Simple)"), a radio button 612 (with text "Series (Simple)"), a radio button 613 (with text "Series Pairs"), and a radio button 614 (with text "Series Parallel").

A graphical plant configuration 620 (e.g., a single chiller configuration) is disposed under its corresponding radio button 610. The plant configuration 620 includes a chiller and a pipe of a fluid circuit.

A graphical plant configuration 621 (e.g., chillers arranged in parallel configuration) is disposed under its corresponding radio button 611. The plant configuration 621 includes a first chiller, a second chiller arranged in parallel with the first chiller, and pipes of a fluid circuit.

A graphical plant configuration 622 (e.g., chillers arranged in series configuration) is disposed under its corresponding radio button 612. The plant configuration 622 includes a first chiller, a second chiller arranged in series with the first chiller, and a pipe of a fluid circuit.

A graphical plant configuration 623 (e.g., chillers arranged in series pairs configuration) is disposed under its corresponding radio button 613. The plant configuration 623 includes a first chiller, a second chille arranged in series with the first chiller, a third chiller, a fourth chiller arranged in series with the third chiller, and pipes of a fluid circuit. The first and the second chillers are arranged in in parallel to the third and the fourth chillers. It will be appreciated that the first chiller and the second chiller (or the third chiller and the fourth chiller) are dedicated to one another by way of their interconnected piping. Within the first chiller and the second chiller (or the third chiller and the fourth chiller) set, fluid flows through the upstream chiller, then through the downstream chiller.

A graphical plant configuration 624 (e.g., chillers arranged in series parallel configuration) is disposed under its corresponding radio button 614. The plant configuration 624 includes a first pod 624A (which includes a first, a second, and a third chillers arranged in parallel to each other), a second pod 624B (which includes a fourth, a fifth, and a sixth chillers arranged in parallel to each other), and pipes of a fluid circuit. The first pod 624A (the first, the second, and the third chillers) is arranged in series with the second pod 624B (the fourth, the fifth, and the sixth chillers). It will be appreciated that the first pod 624A includes a set of parallel upstream chillers in series with the second pod 624B which includes a set of parallel downstream chillers. In an embodiment, fluid flows through any upstream chiller in the first pod 624A, as long as its associated valves are open, and then flow through any downstream chiller in the second pod 624B, as long as its associated valves are open. In such embodiment, no upstream chiller is strictly paired with a specific downstream chiller.

It will be appreciated that there can be other plant configurations (not shown). It will be appreciated that the setup wizard can obtain a plurality of plant configurations in a library (e.g., a configuration library) that is pre-stored in the memory (e.g., of the controller), and display each plant configuration and its corresponding radio button in the GUI 600.

The information button 640, when it is clicked on, is configured to show information that is helpful to understand the components of the GUI 600. The buttons 650 include a "Cancel" button (configured to cancel the running of the setup wizard when is clicked on), a "Previous" button (configured to navigate the current GUI 600 of the setup wizard to a previous GUI (e.g., 500 of FIG. 5) when is clicked on), and a "Next" button (configured to navigate the current GUI 600 of the setup wizard to the next GUI (e.g., 700 of FIG. 7) when is clicked on).

It will be appreciated that when no radio button (610, 611, 612, 613, 614, etc.) is selected, the "Next" button may be disabled. When any one of the radio buttons (610, 611, 612, 613, 614, etc.) is selected, the "Next" button may be enabled, and components (see FIG. 6B-6E) may be shown next to the selected graphical chiller configuration (620, 621, 622, 623, 624) in the same GUI 600 to e.g., allow user(s) to further configure the chiller(s) for the chiller plant (and its control logic) to be generated.

In an embodiment, when the radio button 610 (with text "Single Chiller") is selected, the "Next" button is enabled.

In an embodiment, when the radio button 611 (with text "Parallel (Simple)") is selected, the "Next" button is enabled, and FIG. 6B is shown next to the graphical plant configuration 621 in the same GUI 600. FIG. 6B shows a label "Number of Chillers" and a text field for entering/inputting the number of chillers in the chiller plant to be generated. FIG. 6B also shows a label "Pump Configuration" and a dropdown list showing "Dedicated Pumps", "Manifolded Pumps", and "No Pumps" for selection. It will be appreciated that if a "Decoupled" plant type is selected from FIG. 5, the label is "Primary Pump Configuration" instead of "Pump Configuration". FIG. 6B further shows a label "Number of Pumps in Manifold" and a text field for entering/inputting the number of pumps, when "Manifolded Pumps" is selected from the dropdown list.

In an embodiment, when the radio button 612 (with text "Series (Simple)") is selected, the "Next" button is enabled, and FIG. 6C is shown next to the graphical plant configuration 622 in the same GUI 600. FIG. 6C shows a label "Number of Chillers" and a text field for entering/inputting the number of chillers in the chiller plant to be generated.

In an embodiment, when the radio button 613 (with text "Series Pairs") is selected, the "Next" button is enabled, and FIG. 6D is shown next to the graphical plant configuration 623 in the same GUI 600. FIG. 6D shows a label "Number of Series Pairs" and a text field for entering/inputting the number of pairs of chillers in the chiller plant to be generated. FIG. 6D also shows a label "Pump Configuration" and a dropdown list showing "Dedicated Pumps", "Manifolded Pumps", and "No Pumps" for selection. It will be appreciated that if a "Decoupled" plant type is selected from FIG. 5, the label is "Primary Pump Configuration" instead of "Pump Configuration". FIG. 6D further shows a label "Number of Pumps in Manifold" and a text field for entering/inputting the number of pumps, when "Manifolded Pumps" is selected from the dropdown list.

In an embodiment, when the radio button 614 (with text "Series Parallel") is selected, widgets (e.g., texts and/or arrows) may be displayed to indicate the pods (624A, 624B), and FIG. 6E is shown next to the graphical plant configuration 624 in the same GUI 600. FIG. 6E shows a label "Number of Pods", a text field for entering/inputting the number of pods in the chiller plant to be generated, and an "Apply" button. FIG. 6E also shows a label "Number of Chillers in Pod 1" and a text field for entering/inputting the number of chillers in the first pod, and a label "Number of Chillers in Pod 2" and a text field for entering/inputting the number of chillers in the second pod. When the number of pods are entered and the "Apply" button is clicked, FIG. 6E further shows dynamically updated labels indicating the number of chillers in the pod(s) and shows dynamically updated text field(s) for entering/inputting the number of chillers in such pod(s) in the same GUI 600 based on the number of pods entered, and the "Next" button is enabled.

In operation, a user can select any one of the radio buttons (610, 611, 612, 613, 614, etc.) based on e.g., a chiller configuration, so that the chiller configuration (e.g., 620, 621, 622, 623, 624, or other configuration) is determined or selected. When the "Previous" button is clicked, the GUI 600 is changed back to GUI 500 of FIG. 5. When the "Next" button is clicked, the GUI 600 is changed to GUI 700.

Figure 7:
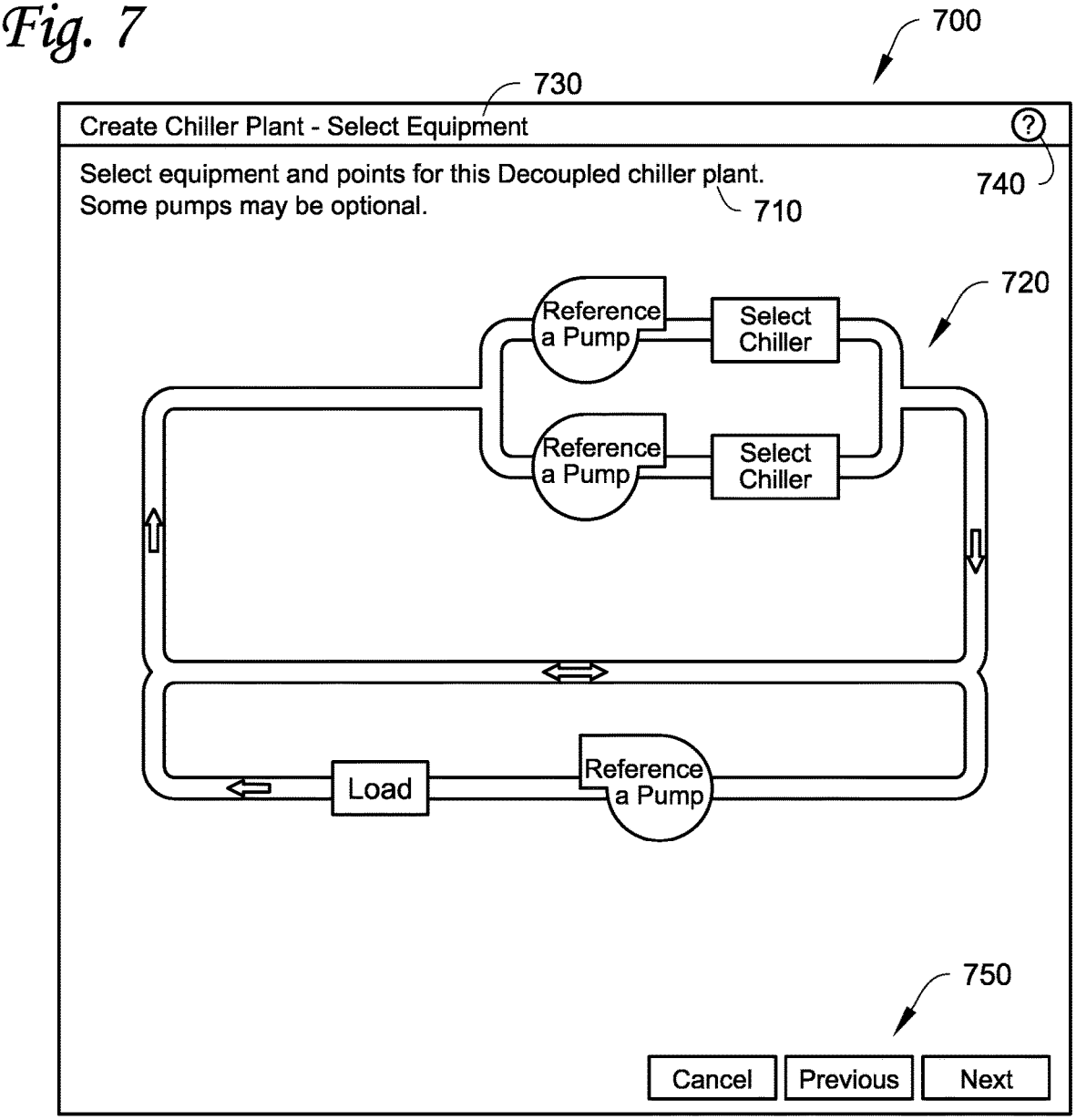

FIG. 7 illustrates a GUI 700 of a setup wizard, according to an embodiment. In an embodiment, the GUI 700 can be a frame including a title 730, a label 710, a plant type 720, buttons 750, and information button 740 in the frame.

In FIG. 7, the title 730 includes text "Create Chiller Plant—Select Equipment". It will be appreciated that the text disclosed herein can be any suitable text. The label 710 includes text "Select equipment for this Decoupled chiller plant. Some pumps may be optional" when a "Decoupled" chiller plant type is selected in FIG. 5. The label 710 may be different depending on the chiller type selections in FIG. 5.

A graphical plant 720 is displayed in or around the middle of the GUI 700. It will be appreciated that the plant 720 is dynamically generated based on the selections from GUIs 500, 600, etc. In this example embodiment, the plant 720 includes chiller(s) having a "Parallel (Simple)" configuration, pump(s) (each pump is disposed upstream of a chiller), a load having a pump disposed upstream of the load, a bypass pipe disposed in parallel to the load, and a fluid circuit showing a direction of a fluid flow (see arrows).

Each of the chiller(s) shows a dropdown list so that a user can select a chiller from the dropdown list. The chiller(s) may be air cooled chillers, water cooled chillers, or the like.

It will be appreciated that other components (e.g., pumps, valves, loads, etc.) can be selected or configured when their corresponding icons in the GUI 700 of FIG. 7 are clicked. In this embodiment, the GUI 700 shows icons of pumps and a load. It will be appreciated that the setup wizard can obtain a plurality of components in a library (e.g., a component library) that is pre-stored in the memory (e.g., of the controller), and display each component in the GUI 700 when the component is e.g., clicked on or selected from its corresponding dropdown list. In one embodiment, the component library may be predetermined e.g., for a new plant. In another embodiment, the component library may be generated via e.g., discovering for existing plants. For example, the controller may discover (determine and/or identify) the components connected to the controller in the network of the BAS (e.g., by pinging the component, scanning the network, etc. and by receiving response from the components), and add the components into the component library. It will also be appreciated that the setup wizard can obtain parameters of the plurality of components in a library (e.g., a parameter library) that is pre-stored in the memory (e.g., of the controller), and display the parameters of the components in the GUI for operation (e.g., selecting, inputting, changing, and the like).

For example, in an embodiment, a user can select air cooled chiller or water cooled chiller. When an air cooled chiller is selected, the user can select corresponding compressor type (e.g., screw or scroll, etc.). When a water cooled chiller is selected, the user can select corresponding compressor type (e.g., centrifugal or screw or scroll, etc.). The user can further configure other parameters of the components (e.g., chiller water minimum setpoint, variable speed compressor or fixed speed compressor, alarm, energy consumption inputs, sensor inputs, etc.) and parameters (e.g., operational parameters) of the plant/system. Such configurations may be done via e.g., different GUIs (e.g., intervening GUI(s) between GUI 700 and GUI 800) of the setup wizard.

The information button 740, when it is clicked on, is configured to show information that is helpful to understand the components of the GUI 700. The buttons 750 include a "Cancel" button (configured to cancel the running of the setup wizard when is clicked on), a "Previous" button (configured to navigate the current GUI 700 of the setup wizard to a previous GUI 600 when is clicked on), and a "Next" button (configured to navigate the current GUI 700 of the setup wizard to the next GUI (e.g., 800 of FIG. 8) when is clicked on). It will be appreciated that the "Next" button may be disabled until all components (e.g., chillers (e.g., capacity, chilled water setpoint minimum, total run hours, the sequence of operation, efficiencies, etc.), pumps (e.g., the number and/or types of pumps, etc.), valves, loads, etc.) are selected and/or configured. It will also be appreciated that there may be other intervening GUI(s) between GUI 700 and GUI 800.

In operation, a user can select the components (e.g., chillers) based on e.g., components of the chiller configuration and/or the chiller type of the plant of the building or the BAS, so that the components (e.g., chillers) may be determined or selected. When the "Previous" button is clicked, the GUI 700 is changed back to GUI 600. When the "Next" button is clicked, the GUI 700 is changed to e.g., GUI 800 (or other intervening GUI(s) between 700 and 800). It will be appreciated that when the "Next" button is clicked, the setup wizard may perform a validation (e.g., check for duplicate selections), and if any issue is found (e.g., duplicate selections are found) during the validation, an error message may be displayed and the GUI 700 of the setup wizard may not navigate to the next GUI until e.g., the issue is fixed.

Figure 8:
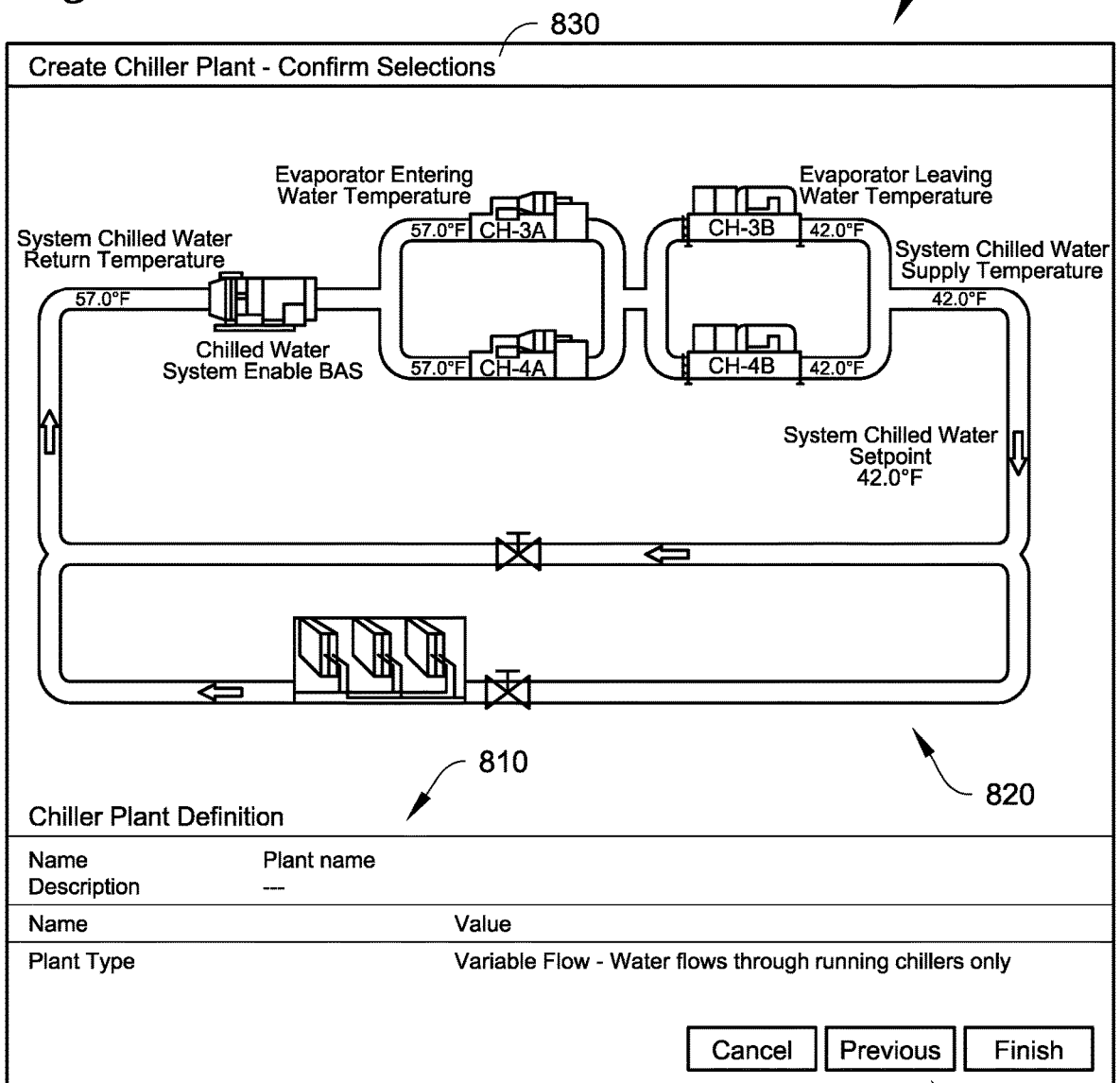

FIG. 8 illustrates a GUI 800 of a setup wizard, according to an embodiment. In an embodiment, the GUI 800 can be a frame including a title 830, text fields 810, a chiller plant diagram 820, and buttons 850 in the frame. In FIG. 8, the title 830 includes text "Create Chiller Plant—Confirm Selections". It will be appreciated that the text disclosed herein can be any suitable text.

It will be appreciated that text fields 810 and the chiller plant diagram 820 are dynamically generated based on the selections or configurations from previous GUI(s) (e.g., GUI 400, 500, 600, 700, etc.). The chiller plant diagram 820 includes chillers (four chillers are shown in 820 as an example), load(s) (e.g., cooling coils in air handlers or other equipment), pump(s) (one pump is shown in 820 as an example, there can be multiple pumps or multiple manifolded pumps, etc.), valve(s), and a fluid circuit showing a direction of a fluid flow (see arrows). The valves can be any suitable flow control device (valve, switch, and the like) that are used to control the fluid flow to e.g., bypass or flow through the loads. A controller can control the valves (e.g., directly or via a relay), the sensors (not shown), and other components of the chiller plant to achieve predetermined or desired performance. In an embodiment, the controller may control the components (chillers, pumps, condensers, towers, etc.) in the plant via digital communication or by hardwired connections (e.g., via binary or analog control).

In an embodiment, the chiller plant diagram 820 may be an interactive plant diagram with real-time parameter values (e.g., system chilled water return temperature, evaporator entering water temperature, evaporator leaving water temperature, system chilled water supply temperature, system chilled water setpoint, etc.) obtained from interacting with the plant of the building or BAS. The real-time parameter values can be obtained, e.g., by sensor(s) (e.g., temperature, pressure, humidity, etc.) of plant of the building or BAS.

It will be appreciated that the plant diagram 820 may include real-time values/data and may provide users the ability to perform overrides (e.g., allowing users to control the plant via overrides such as changing setpoint, changing sequence of chillers, changing schedule, etc.), which may provide input to the plant control logic through the GUIs. The plant control logic may override the operation point for the components (e.g. pump on, valve open, etc.) through the BAS communication. The plant diagram 820 includes the components and may link the components to more details about the components.

Text fields 810 show the configurations dynamically generated from previous GUIs of the setup wizard, including e.g., the name and description of the plant (from GUI 400), the plant type (from GUI 500), the chiller configuration (from GUI 600), the components (equipment) of the plant (from GUI 700), the configuration of the parameters of the components and the system (from intervening GUIs between 700 and 800), etc. It will be appreciated that the text fields 810 shown in FIG. 8 are for illustrative purposes only and may not include complete configurations.

The buttons 850 include a "Cancel" button (configured to cancel the running of the setup wizard when is clicked on), a "Previous" button (configured to navigate the current GUI 800 of the setup wizard to a previous GUI 700 (or intervening GUIs between 700 and 800) when is clicked on), and a "Finish" button (configured to complete the creation and/or configurations of the plant via the setup wizard when is clicked on, and a dashboard 900 is created/configured).

Figure 9A:
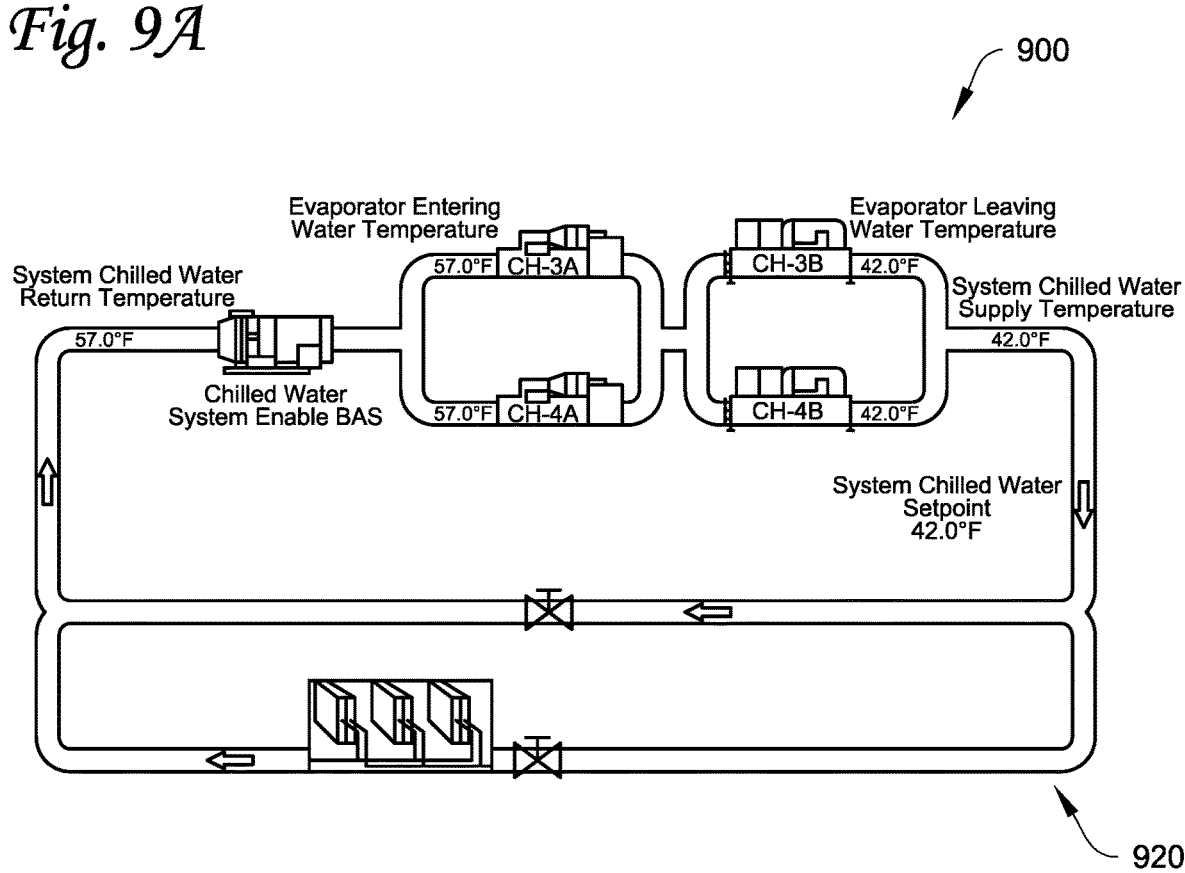

FIGS. 9A and 9B illustrate a graphical dashboard 900 including a graphical plant diagram 920, a plant control logic associated with components of the plant diagram 920, and key performance indicators (KPI) 910 of the plant, according to an embodiment. It will be appreciated that the graphical plant dashboard 900 includes the components of the plant such as pump(s), valve(s), piping, chiller(s), boiler(s), load(s), etc. and the operating control or operating logic (e.g., the plant control logic, which may be software algorithms executed by the controller) associated with the components.

The dashboard 900 is dynamically generated by the setup wizard based on the selections or configurations (e.g., the chiller plant name, the chiller type, the chiller configuration, the components, and the parameters of the components and the system) from e.g., the GUIs 400, 500, 600, 700, etc. The plant diagram 920 is similar to the plant diagram 820 of FIG. 8. The dashboard 900 may reflect the status of the real devices (e.g. components) and/or the status of the plant.

The KPIs 910 include performance such as power value of components (such as pumps, fans, etc.), chiller water flow, condenser water flow, plant heat of rejections, chiller water temperature (supply ad return), condenser water temperature (entering and leaving), system chilled water temperature setpoint, the thermal output and efficiency and power consumption of the plant, ambient temperature (drybulb and wet-bulb), chiller and plant efficiency, maximum daily plant thermal cooling, etc.

It will be appreciated that the efficiency may be determined by summing the power of all of the plant's components and dividing it by the cooling power being delivered to the load (kW/Ton). The efficiency (kW/Ton) KPI may require sensors to be installed in the BAS, and the efficiency may be determined based on e.g., data sensed by the sensors. For example, power (kW) may be measured for each component (e.g., pumps, fans, compressors, etc.) in the plant, and thermal output (Tons) is the measurement of cooling power being delivered by the plant. Tons can be either measured directly with an energy meter (which includes a flow meter and temperature sensors), or calculated using sensed data from separate temperature sensors and a flow meter. Coefficient of Performance (COP) is the inverse of kW/Ton and is the ratio of power being delivered to the system divided by the power consumption of the plant (power out/power in).

It will be appreciated that the plant shown in FIGS. 9A and 9B is for illustrative purpose only, and the plant may be a water plant (chilled water and/or heated water), a boiler plant, a simultaneous heating and/or cooling plant, an air plant, etc.

FIGS. 10A and 10B illustrate a list of KPIs that can be shown as part of the KPIs 910 of FIGS. 9A and 9B, according to an embodiment. In FIGS. 10A and 10B, the column "KPI" may indicate that the data (e.g., performance, etc.) for such KPI item may show in the KPIs 910 of FIGS. 9A and 9B. The column "Ask about this" may indicate that during the creation of the dashboard 900, whether the setup wizard requires the user to select/configure the data source for the KPI item, or the data for the KPI item is calculated based on other parameters. The column "In final graphic" may indicate whether the data for the KPI item is shown in the graphical plant diagram 920 of FIGS. 9A and 9B. The column "In dashboard" may indicate whether the data for the KPI item is shown in the dashboard 900 and/or KPIs 910 of FIGS. 9A and 9B.

It will be appreciated that the generated dashboard 900 of FIGS. 9A and 9B can be saved (e.g., as a part of an application, etc.), edited and/or reconfigured via a tool such as an editing tool. When being edited via the tool, the GUIs for editing the dashboard 900 may be similar to the setup wizard that is used to create the dashboard 900. The differences between the GUIs of the setup wizard and the GUIs of the tool may include the title of the GUIs (e.g., "Create" in the setup wizard versus "Edit" in the tool) and the default values of the fields/selections (e.g., predetermined value/selection in the setup wizard versus user selected value in the tool). In an embodiment, the setup wizard and the tool may be a single software application.

Figure 11:
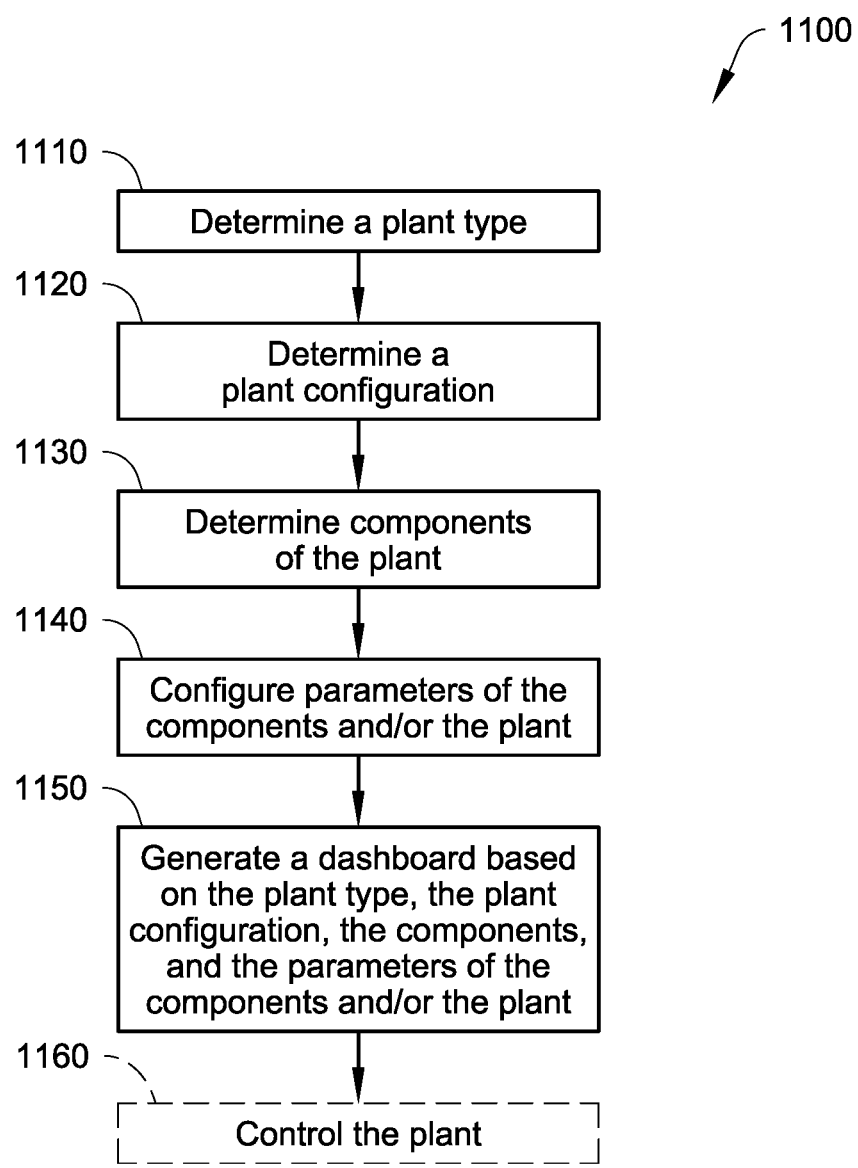
FIG. 11 illustrates a flow chart of a method for dynamically generating a graphical dashboard via a setup wizard, according to an embodiment.

FIG. 11 illustrates a flow chart of a method 1100 for dynamically generating or editing a graphical dashboard via graphical user interfaces setup wizard, according to an embodiment. The dashboard can be e.g., the dashboard 900 of FIGS. 9A and 9B that includes a graphical plant diagram (including the components of the plant such as pump(s), valve(s), piping, chiller(s), boiler(s), load(s), etc.), an operating control or operating logic (e.g., the plant control logic) associated with the components, and the KPIs.

The operational flow chart 1100 may include one or more operations, actions, or functions depicted by one or more blocks 1110, 1120, 1130, 1140, 1150, and 1160. Although illustrated as discrete blocks, various blocks may be divided into additional blocks, combined into fewer blocks, or eliminated, depending on the desired implementation. As a non-limiting example, the description of the method 1100, corresponding to the depiction thereof in FIGS. 4-10 and performed by the controller(s) described herein or any other suitable controllers, according to one or more example embodiments described herein, pertains to dynamically generating or editing a dashboard including a graphic plant diagram, a plant control logic, and/or KPIs via graphical user interfaces of a setup wizard or a tool such as an editing tool. The processing flow 1100 may begin at block 1110.

Block 1110 may refer to a controller running a GUI setup wizard (or tool) and a user determining a type of a plant through the setup wizard or tool. It will be appreciated that block 1110 may include a user identifying the type of the plant from a plurality of plant types (displayed by the setup wizard or tool) in a library (e.g., a layout library), and selecting the type of the plant that matches a building automation system mechanical layout. Block 1110 may be followed by block 1120.

Block 1120 may refer to a user determining a configuration of the plant through the setup wizard or tool. It will also be appreciated that block 1120 may include a user identifying the configuration of the plant from a plurality of plant configurations (displayed by the setup wizard or tool) in a library (e.g., a configuration library), and selecting the configuration of the plant that matches a configuration of the plant of the building automation system. Block 1120 may be followed by block 1130.

Block 1130 may refer to a user determining at least one component of the plant through the setup wizard or tool. It will be appreciated that block 1130 (determining components) is based on the determination or selection of block 1110 (the determined plant type) and/or the determination or selection of block 1120 (the determined plant configuration). It will also be appreciated that block 1130 may include a user identifying the components of the plant from a plurality of plant components (displayed by the setup wizard or tool) in a library (e.g., components library), and selecting the components of the plant that matches components of the plant of the building automation system. The at least one component of the plant may include one or more of at least one chiller, at least one condenser pump for pumping fluid, at least a flow control device (e.g., a valve, a switch, etc.), at least one condenser or at least one tower fan for cooling the fluid, and/or a fluid circuit for directing a flow of the fluid pumped by the at least one condenser pump, etc. Block 1130 may be followed by block 1140.

Block 1140 may refer to a user configuring parameters of the at least one component of the plant and/or parameters of the plant (the system) through the setup wizard or tool. It will be appreciated that block 1140 (configuring parameters) is based on the determination or selection of block 1130 (the determined components). It will also be appreciated that block 1140 may include a user identifying parameters of the components and/or the plant from parameters of the plurality of plant components and/or the system (displayed by the setup wizard or tool) in a library (e.g., parameters library), and configuring the parameters of the components or the plant that matches parameters of the components and/or the plant of the building automation system. Block 1140 may be followed by block 1150.

Block 1150 may refer to the setup wizard or tool generating a plant dashboard having a graphical plant diagram, a plant control logic of the plant, and/or KPIs, based on the selected plant type, the selected plant configuration, the selected at least one component, and the configured parameters of the at least one component and/or the plant. In an embodiment, the setup wizard or tool generating the graphical dashboard includes the setup wizard or tool generating an interactive plant diagram (e.g., showing real-time sensed/measured parameter values) to interact with the plant. Block 1150 may be followed by block 1160.

Block 1160 may refer to a controller controlling the plant based on the generated or edited plant control logic of the plant dashboard. It will be appreciated that block 1160 may include the controller determining control points of the plant, the controller mapping the control points to the components shown in the generated dashboard, and/or the controller controlling the plant based on the mapped control points (e.g., the components shown in the generated dashboard) such as the controller controlling one of more of the valves in the generated dashboard to achieve a desired/predetermined chiller performance and/or chiller capacity. In an embodiment, the control points may be mapped based on semantic tagging (e.g., metadata of the components). In another embodiment, the control points may be mapped by selecting the points from a list of installed/discovered components.

It will be appreciated that in other embodiments, the setup wizard or tool can gather data (e.g., selections, configurations, etc. of a plant) through e.g., user input from check boxes, radio buttons, drop down menus, text input, etc. without graphical diagram(s) showing the data. Such setup wizard or tool may be dependent upon user's knowledge of the text terms, the configuration possibilities of a plant, the setup of each configuration possibility, etc. In such embodiments, graphical interfaces for human interaction may be custom built through a separate process that may require user(s) to add components of the plant to a library and map each of these components to an underlying data point and/or control point within previously configured system. Users (e.g., a technician responsible for installation, etc.) responsible for creating the chiller layout may be different from the end user (e.g., administrator of a building or BAS) of the plant, and different requirements from different users may result in re-work.

Embodiments disclosed herein can reduce the required knowledge of the mechanical system of a plant in a building by simplifying the configuration of the plant. The required knowledge can be reduced as graphical depictions guide selection of plant type and plant configuration, with corresponding pump, tower, and other equipment configurations along with a dynamically built graphical illustration upon completion of the setup wizard. Embodiments disclosed herein can also reduce the time required to generate the programming and a GUI for operation of the plant. Embodiments disclosed herein can further help to generate a GUI dynamically based upon selections made during the configuration. Without the embodiments disclosed herein, users may not realize setup mistakes until later in the process so that time may be wasted, unnecessary steps may be performed based on erroneous inputs, and rework may be needed. With the embodiments disclosed herein, mistakes which the user makes while creating or editing the plant can be more readily identifiable before plant creation or edition is complete due to the auto-generated graphic that can be displayed on the last page/GUI of the creation setup wizard or tool.

Aspects:

It is appreciated that any one of aspects 1-9 and any one of aspects 10-15 can be combined with each other.

Aspect 1. A method of dynamically generating or editing a plant dashboard via a graphical user interface (GUI) setup, the method comprising:
  determining a type of a plant through the GUI setup;
  determining a configuration of the plant through the GUI setup;
  determining at least one component of the plant through the GUI setup;
  configuring parameters of the at least one component of the plant through the GUI setup;
  generating the plant dashboard including a plant control logic based on the type, the configuration, the at least one component, and the parameters of the at least one component of the plant; and
  controlling the plant based on the plant control logic.

Aspect 2. The method according to aspect 1, further comprising:
  generating at least one key performance indicator (KPI) of the plant based on the type, the configuration, the at least one component, and the parameters of the at least one component of the plant.

Aspect 3. The method according to aspect 2, further comprising:
  generating a graphical plant diagram,
  wherein the plant dashboard is independent to the GUI setup, and
  the graphical plant diagram and the at least one KPI are displayed on the plant dashboard.

Aspect 4. The method according to any one of aspects 1-3, wherein generating the graphical plant diagram includes generating an interactive plant diagram to interact with the plant based on the type, the configuration, the at least one component, and the parameters of the at least one component of the plant.

Aspect 5. The method according to any one of aspects 1-4, further comprising:
  determining control points of the plant; and
  mapping the control points to the plant dashboard,
  wherein controlling the plant includes controlling the plant based on the mapped control points.

Aspect 6. The method according to any one of aspects 1-5, wherein the at least one component of the plant includes one or more of at least one chiller, at least one pump for pumping fluid, at least one load, and a fluid circuit for directing a flow of the fluid pumped by the at least one pump.

Aspect 7. The method according to any one of aspects 1-6, wherein determining the type of the plant includes identifying the type of the plant from a plurality of plant types in a layout library, and selecting the type of the plant that matches a building automation system layout.

Aspect 8. The method according to any one of aspects 1-7, wherein determining the at least one component of the plant is based on the determined type of the plant and the determined configuration of the plant.

Aspect 9. The method according to any one of aspects 1-8, wherein configuring the parameters is based on the determined at least one component of the plant.

Aspect 10. A building automation system (BAS) comprising:
a plant associated with at least one of a space, a system, or a subsystem for at least a portion of a building or a campus;
a controller; and
a graphical user interface (GUI) setup,
wherein the GUI setup is configured to generate or edit a plant dashboard including a plant control logic based on a type of the plant, a configuration of the plant, at least one component of the plant, and parameters of the at least one component of the plant,
the controller is configured to control the plant based on the plant control logic.

Aspect 11. The system according to aspect 10, wherein the GUI setup is further configured to generate at least one key performance indicator (KPI) of the plant based on the type, the configuration, the at least one component, and the parameters of the at least one component of the plant.

Aspect 12. The system according to aspect 11, wherein the GUI setup is further configured to generate a graphical plant diagram,
the graphical plant diagram and the at least one KPI are displayed on the plant dashboard.

Aspect 13. The system according to any one of aspects 10-12, wherein when the GUI setup generates the graphical plant diagram, the GUI setup generates an interactive plant diagram to interact with the plant based on the type, the configuration, the at least one component, and the parameters of the at least one component of the plant.

Aspect 14. The system according to any one of aspects 10-13, wherein at least one component of the plant includes one or more of at least one chiller, at least one pump for pumping fluid, at least one load, and a fluid circuit for directing a flow of the fluid pumped by the at least one pump.

Aspect 15. The system according to any one of aspects 10-14, wherein the GUI setup provides a plurality of plant types, a plurality of plant configurations, a plurality of components of the plant, and parameters of the plurality of components of the plant in a library; and
the GUI setup generates the plant dashboard based on selections from the plurality of plant types, the plurality of plant configurations, the plurality of components of the plant, and the parameters of the plurality of components of the plant.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for dynamically generating or editing a plant dashboard via a graphical user interface (GUI) setup, the method comprising:
determining a type of a chiller plant through the GUI setup, the chiller plant having at least one chiller, at least one pump for pumping fluid, at least one load, and a fluid circuit for directing a flow of the fluid pumped by the at least one pump;
determining a configuration of the chiller plant through the GUI setup, the configuration including one or more configurations for the at least one chiller;
determining at least one component of the chiller plant through the GUI setup, the at least one component including the at least one chiller;
configuring parameters of the at least one component of the chiller plant through the GUI setup;
generating the plant dashboard including a plant control logic based on the type, the configuration, the at least one component, and the parameters of the at least one component of the chiller plant; and
operating the chiller plant based on the plant control logic,
wherein the one or more configurations for the at least one chiller include a single chiller configuration, a parallel configuration, a series configuration, a series pairs configuration, and a series parallel configuration.

2. The method according to claim 1, further comprising: generating at least one key performance indicator (KPI) of the chiller plant based on the type, the configuration, the at least one component, and the parameters of the at least one component of the chiller plant.

3. The method according to claim 2, further comprising: generating a graphical plant diagram,
wherein the plant dashboard is independent to the GUI setup, and
the graphical plant diagram and the at least one KPI are displayed on the plant dashboard.

4. The method according to claim 3, wherein generating the graphical plant diagram includes generating an interactive plant diagram to interact with the chiller plant based on the type, the configuration, the at least one component, and the parameters of the at least one component of the chiller plant.

5. The method according to claim 1, further comprising: determining control points of the chiller plant; and
mapping the control points to the plant dashboard,
wherein operating the chiller plant includes controlling the chiller plant based on the mapped control points.

6. The method according to claim 1, wherein determining the type of the chiller plant includes identifying the type of the chiller plant from a plurality of plant types in a layout library, and selecting the type of the chiller plant that matches a building automation system layout.

7. The method according to claim 1, wherein determining the at least one component of the chiller plant is based on the determined type of the chiller plant and the determined configuration of the chiller plant.

8. The method according to claim 1, wherein configuring the parameters is based on the determined at least one component of the chiller plant.

9. A building automation system (BAS) comprising:
a chiller plant associated with at least one of a space, a system, or a subsystem for at least a portion of a building or a campus, the chiller plant having at least one chiller, at least one pump for pumping fluid, at least one load, and a fluid circuit for directing a flow of the fluid pumped by the at least one pump;
a controller; and
a graphical user interface (GUI) setup,
wherein the GUI setup is configured to generate or edit a plant dashboard including a plant control logic based on a type of the chiller plant, a configuration of the chiller plant, at least one component of the chiller plant, and parameters of the at least one component of the chiller plant,
the configuration includes one or more configurations for the at least one chiller, the at least one component includes the at least one chiller,
the controller is configured to operate the chiller plant based on the plant control logic,
wherein the one or more configurations for the at least one chiller include a single chiller configuration, a parallel configuration, a series configuration, a series pairs configuration, and a series parallel configuration.

10. The system according to claim 9, wherein the GUI setup is further configured to generate at least one key performance indicator (KPI) of the chiller plant based on the type, the configuration, the at least one component, and the parameters of the at least one component of the chiller plant.

11. The system according to claim 10, wherein the GUI setup is further configured to generate a graphical plant diagram,
the graphical plant diagram and the at least one KPI are displayed on the plant dashboard.

12. The system according to claim 11, wherein when the GUI setup generates the graphical plant diagram, the GUI setup generates an interactive plant diagram to interact with the chiller plant based on the type, the configuration, the at least one component, and the parameters of the at least one component of the chiller plant.

13. The system according to claim 9, wherein the GUI setup provides a plurality of plant types, a plurality of plant configurations, a plurality of components of the chiller plant, and parameters of the plurality of components of the chiller plant in a library; and
the GUI setup generates the plant dashboard based on selections from the plurality of plant types, the plurality of plant configurations, the plurality of components of the chiller plant, and the parameters of the plurality of components of the chiller plant.

14. The method according to claim 1, wherein the type of the chiller plant includes at least one of a constant flow plant type, a stepped flow plant type, a variable primary flow plant type, and a decoupled plant type.

15. The method according to claim 1, further comprising:
discovering the at least one component connected to a network by scanning the network and receiving response from the at least one component.

16. The system according to claim 9, wherein the type of the chiller plant includes at least one of a constant flow plant type, a stepped flow plant type, a variable primary flow plant type, and a decoupled plant type.

17. The system according to claim 9, wherein the controller is further configured to discover the at least one component connected to a network by scanning the network and receiving response from the at least one component.

18. The method according to claim 1, further comprising:
generating a description of the chiller plant through the GUI setup before determining the type of the chiller plant; and
enabling or disabling features of the plant control logic through the GUI setup.

19. The method according to claim 1, wherein determining the configuration of the chiller plant is enabled after the type of the chiller plant is determined, and determining the at least one component of the chiller plant is enabled after the configuration of the chiller plant is determined.

20. The method according to claim 1, further comprising:
enabling configuration for a next GUI setup after the configuration of the chiller plant is determined, and
when selected, configuring the parallel configuration, the series configuration, the series pairs configuration, or the series parallel configuration is displayed on a same graphical user interface as determining the configuration of the chiller plant.

* * * * *